US012143908B2

(12) United States Patent
Nagasawa (10) Patent No.: US 12,143,908 B2
(45) Date of Patent: Nov. 12, 2024

(54) EMERGENCY REPORTING DEVICE FOR VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 252 days.

(21) Appl. No.: 17/386,532

(22) Filed: Jul. 27, 2021

(65) Prior Publication Data

US 2022/0038873 A1 Feb. 3, 2022

(30) Foreign Application Priority Data

Jul. 31, 2020 (JP) ................. 2020-130804

(51) Int. Cl.
*G08G 1/0965* (2006.01)
*B60W 30/08* (2012.01)
*H04W 4/46* (2018.01)
*H04W 4/90* (2018.01)

(52) U.S. Cl.
CPC ........... *H04W 4/46* (2018.02); *B60W 30/08* (2013.01); *G08G 1/0965* (2013.01); *H04W 4/90* (2018.02); *B60W 2030/082* (2013.01); *B60W 2556/55* (2020.02); *B60W 2556/65* (2020.02)

(58) Field of Classification Search
CPC ......... H04W 4/029; H04W 4/40; H04W 4/44; H04W 4/46; H04W 4/90; B60W 30/08; B60W 30/095; B60W 2556/55; B60W 2556/65; B60W 2030/082; G08G 1/0965; G08G 1/16; G08G 1/162; G08G 1/164; G08G 1/205; G08B 25/016; G08B 25/10
USPC ....... 340/902, 903, 904, 924–925, 937, 943, 340/961, 973, 978, 426.2, 441, 438, 488, 340/539.23
See application file for complete search history.

(56) References Cited

U.S. PATENT DOCUMENTS

| | | | | |
|---|---|---|---|---|
| 9,731,645 B1* | 8/2017 | Taleb-Bendiab | ....... | H05B 47/19 |
| 11,030,881 B1* | 6/2021 | Nave | ...................... | B60W 30/09 |
| 11,584,370 B1* | 2/2023 | Nave | ....................... | G06F 30/20 |
| 2003/0117273 A1* | 6/2003 | Kuragaki | ............... | G08G 1/205 340/436 |
| 2003/0117274 A1* | 6/2003 | Kuragaki | ............... | G08G 1/205 340/436 |
| 2005/0253699 A1* | 11/2005 | Madonia | ................ | B60K 35/00 340/463 |

(Continued)

FOREIGN PATENT DOCUMENTS

JP 2015-045965 A 3/2015

*Primary Examiner* — Daniel Previl
(74) *Attorney, Agent, or Firm* — Rimon P.C.

(57) ABSTRACT

An emergency reporting device for a vehicle includes an emergency detector and a communicator. The emergency detector is configured to detect or estimate an emergency including a collision of the vehicle. The communicator is configured to, when the emergency of the vehicle is detected or estimated, transmit information related to the emergency to outside so that a succeeding vehicle receives the information related to the emergency. The communicator is configured to, after the information related to the emergency is transmitted, receive acknowledgment information from the succeeding vehicle about reception of the information related to the emergency.

9 Claims, 5 Drawing Sheets

(56) References Cited

U.S. PATENT DOCUMENTS

| | | | |
|---|---|---|---|
| 2011/0210835 A1* | 9/2011 | Kondo | G08G 1/205 |
| | | | 340/425.5 |
| 2015/0061851 A1 | 3/2015 | Tomita et al. | |
| 2015/0061895 A1* | 3/2015 | Ricci | G06V 40/28 |
| | | | 340/902 |
| 2017/0322558 A1* | 11/2017 | Teshima | G07C 5/008 |
| 2020/0128566 A1* | 4/2020 | Wei | H04W 72/0446 |
| 2021/0016805 A1* | 1/2021 | Oba | B60W 60/0051 |
| 2021/0188289 A1* | 6/2021 | Oba | B60W 60/005 |
| 2021/0354691 A1* | 11/2021 | Nave | G05D 1/0088 |

* cited by examiner

EMERGENCY REPORTING DEVICE FOR VEHICLE

CROSS-REFERENCE TO RELATED APPLICATIONS

The present application claims priority from Japanese Patent Application No. 2020-130804 filed on Jul. 31, 2020, the entire contents of which are hereby incorporated by reference.

BACKGROUND

The disclosure relates to an emergency reporting device for a vehicle.

Automobiles or other vehicles may have an accident such as collision. In this case, the vehicle stops at a currently traveling road. Japanese Unexamined Patent Application Publication No. 2015-045965 discloses that accident information is collected and reported to an emergency handling organization.

In some automobiles, occupants may become sick. In this case as well, the automobile may stop at a shoulder of a currently traveling road and report information to the emergency handling organization.

SUMMARY

An aspect of the disclosure provides an emergency reporting device for a vehicle. The emergency reporting device includes an emergency detector and a communicator. The emergency detector is configured to detect or estimate an emergency including a collision of the vehicle. The communicator is configured to, when the emergency of the vehicle is detected or estimated, transmit information related to the emergency to outside so that a succeeding vehicle receives the information related to the emergency. The communicator is configured to, after the information related to the emergency is transmitted, receive acknowledgment information from the succeeding vehicle about reception of the information related to the emergency.

An aspect of the disclosure provides an emergency reporting device for a vehicle. The emergency reporting device includes circuitry. The circuitry is configured to detect or estimate an emergency including a collision of the vehicle. The circuitry is configured to, when the emergency of the vehicle is detected or estimated, transmit information related to the emergency to outside so that a succeeding vehicle receives the information related to the emergency. The circuitry is configured to, after the information related to the emergency is transmitted, receive acknowledgment information from the succeeding vehicle about reception of the information related to the emergency.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

When a vehicle in an emergency such as collision is stopping at either one of a road and its shoulder, an occupant of a succeeding vehicle arriving at the site of the emergency may recognize the emergency by sight. Depending on a road environment, the occupant of the succeeding vehicle cannot recognize the situation by sight unless the succeeding vehicle reaches an area near the site. It is desirable that the occupant of the succeeding vehicle avoid secondary collision with either one of the stopping vehicle and an occupant escaping from the vehicle.

Vehicles have room for improvement to reduce the secondary collision and other accidents.

Figure 1:
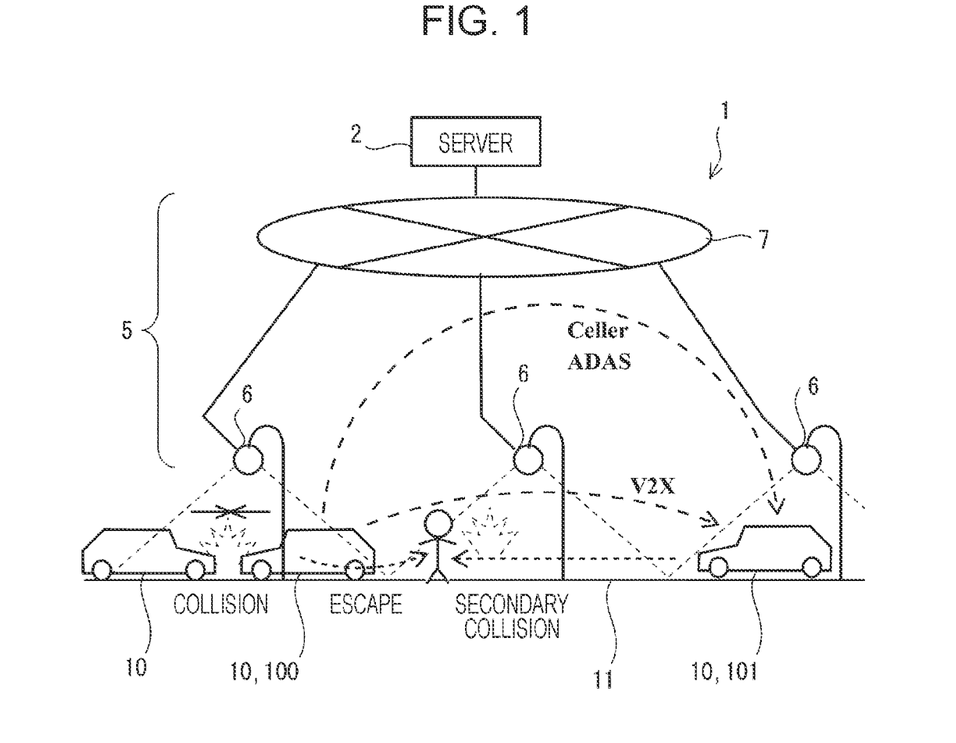
FIG. 1 is an explanatory diagram of an emergency reporting system for automobiles.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description. FIG. 1 is an explanatory diagram of an emergency reporting system 1 for automobiles 10.

The emergency reporting system 1 for the automobiles 10 in FIG. 1 includes emergency reporting devices in the automobiles 10 described later, a plurality of base stations 6 communicable with the emergency reporting devices, a communication network 7 coupled to the base stations 6, and a server 2 coupled to the communication network 7. For example, the server 2 may be provided in a medical organization, a fire department, a police, a security company, a road management company, and other organizations.

In the emergency reporting system 1, when any automobile has an emergency such as an accident, the automobile 10 automatically transmits emergency information to the server 2 via the base station 6 and the communication network 7. Based on the received emergency information, an organization such as a fire department sends an emergency action force to the site for aid. Thus, life-saving treatment can promptly be provided for an occupant of the automobile 10.

For example, the emergency reporting device of the automobile 10 may also transmit the emergency information directly to other automobiles 10 such as a succeeding automobile through V2V communication or through V2X communication via a wireless communication network 5 including the base stations 6 and the communication network 7. Based on the reported emergency information, the other automobiles 10 around the site can address the emergency by either one of stopping and detouring.

In FIG. 1, a plurality of automobiles 10 are traveling along a road 11. Two automobiles 10 on the left are stopping due to head-on collision. A succeeding automobile and other automobiles may detour around the site of the accident. Any automobile 10 may stop around the site and provide first aid to a person in the accident.

When an occupant of any automobile 10 has an emergency, the automobile 10 stops at a shoulder of the road. Behavior of other automobiles is similar to the behavior described above.

In those situations, the other automobiles 10 such as a succeeding automobile can travel appropriately by receiving emergency information in advance from the automobile 10 in the emergency. When the emergency information is not received, the other automobiles 10 may stop after recognizing the occupant escaping from the automobile 10 in the accident by sight near the automobile 10. In this case, the other automobiles 10 may cause secondary collision with either one of the automobile 10 stopping due to the accident and the occupant escaping from the automobile 10.

It is desirable to avoid this situation.

Figure 2:
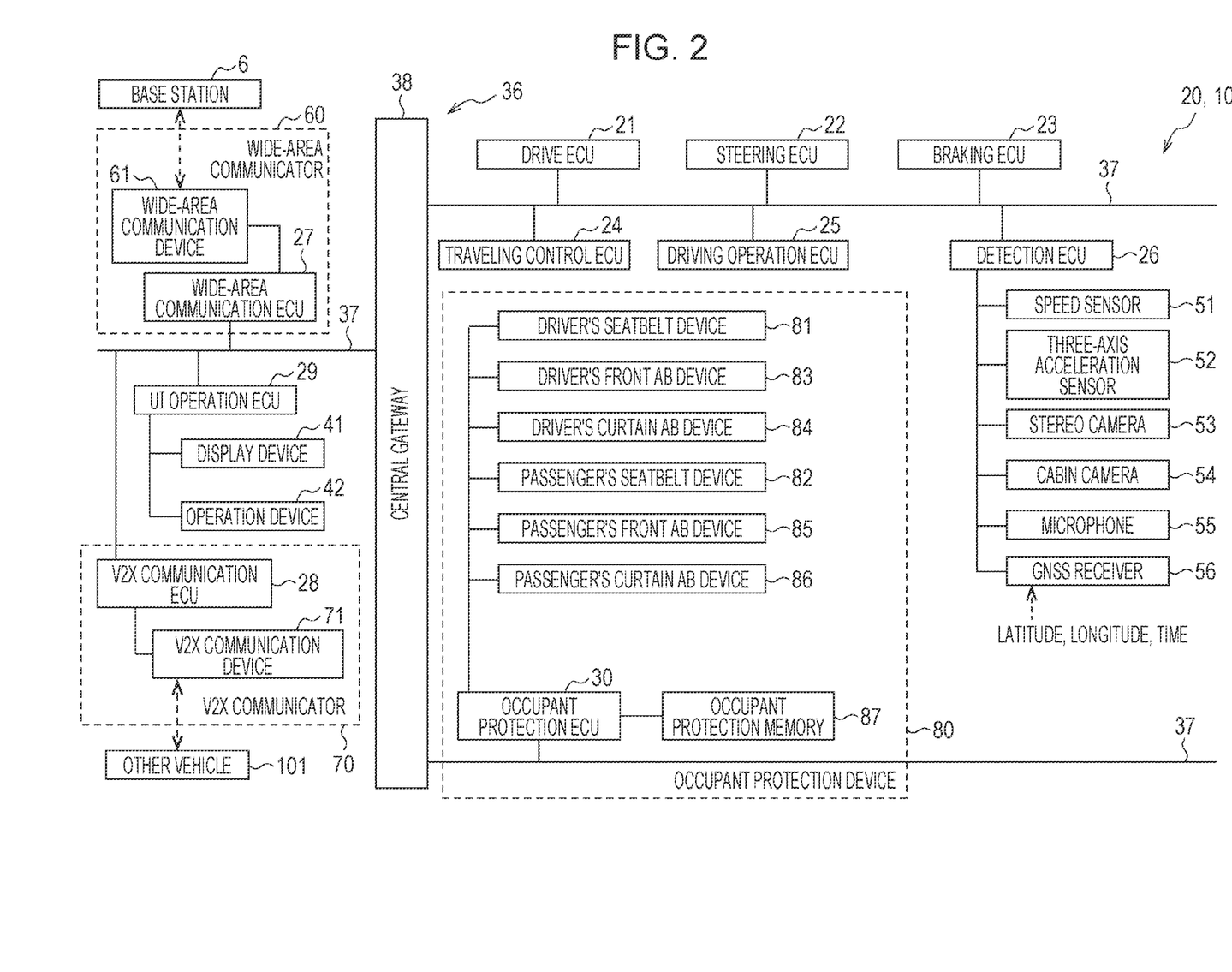
FIG. 2 is an explanatory diagram of a control system serving as an emergency reporting device of an automobile according to an embodiment of the disclosure.

FIG. 2 is an explanatory diagram of a control system 20 serving as the emergency reporting device of each automobile 10 according to the embodiment of the disclosure.

In the control system 20 of the automobile 10 in FIG. 2, a plurality of controllers are represented by control electronic control units (ECUs) mounted on the respective controllers. Each controller may have not only the control ECU but also, for example, a memory that records a control program and data, an input/output port coupled to either one of a control target and its condition detector, a timer that measures a period and a time, and an internal bus that couples those devices.

Examples of the control ECUs illustrated in FIG. 2 include a drive ECU 21, a steering ECU 22, a braking ECU 23, a traveling control ECU 24, a driving operation ECU 25, a detection ECU 26, a wide-area communication ECU 27, a V2X communication ECU 28, a UI operation ECU 29, and an occupant protection ECU 30. The control system 20 of the automobile 10 may have other control ECUs (not illustrated).

The control ECUs are coupled to a vehicle network 36 such as a controller area network (CAN) or a local interconnect network (LIN) employed in the automobile 10. The vehicle network 36 may include a plurality of bus cables 37 that can couple the control ECUs, and a central gateway (CGW) 38 serving as a repeater coupled to the bus cables 37. The control ECUs have different IDs serving as identification information. Basically, each control ECU periodically outputs data to other control ECUs. The data includes an ID of a source control ECU and an ID of a destination control ECU. For example, each of the other control ECUs monitors the bus cables 37 and acquires data and executes processes based on the data when the destination ID is directed to the control ECU. The central gateway 38 monitors the coupled bus cables 37 and, when detecting a control ECU coupled to a bus cable 37 different from that of the source control ECU, outputs data to the bus cable 37. Through the repeating process of the central gateway 38, the control ECUs can exchange data with other control ECUs coupled to bus cables 37 different from those coupled to the source bus cables 37.

For example, a display device 41 and an operation device 42 are coupled to the UI operation ECU 29 as user interfaces for an occupant of the automobile 10. Examples of the display device 41 include a liquid crystal display and a projector. Examples of the operation device 42 include a touch panel, a keyboard, and a non-contact operation detector. For example, the display device 41 and the operation device 42 may be mounted in an occupant's cabin. The UI operation ECU 29 acquires data from the vehicle network 36 and displays the data on the display device 41. The UI operation ECU 29 outputs operations input on the operation device 42 to the vehicle network 36. The UI operation ECU 29 may execute processes based on the input operations, and incorporate results of the processes as data. For example, the UI operation ECU 29 may cause the display device 41 to display a navigation screen for setting destinations, search for a route to a destination selected by inputting an operation, and incorporate the route as route data. The route data may include attribute information such as lanes of roads from a departing location to the destination.

Operation members such as a steering wheel, a brake pedal, an accelerator pedal, and a select lever of transmission (these are not illustrated) are coupled to the driving operation ECU 25 for the occupant to control traveling of the automobile 10. When any operation member is operated, the driving operation ECU 25 outputs, to the vehicle network 36, data including presence or absence of an operation and an operation amount. The driving operation ECU 25 may execute processes related to the operations on the operation members, and incorporate results of the processes as data. For example, when the accelerator pedal is operated in a situation in which either one of a moving object and a stationary object is present in a traveling direction of the automobile 10, the driving operation ECU 25 may make determination about an abnormal operation and incorporate a result of the determination as data.

Detection members for detection of traveling conditions of the automobile 10 are coupled to the detection ECU 26. Examples of the detection members include a speed sensor 51 that detects a speed of the automobile 10, a three-axis acceleration sensor 52 that detects an acceleration of the automobile 10, a stereo camera 53 that images surroundings of the automobile 10, a cabin camera 54 that images the occupant in the cabin, a microphone 55 that generates data on external and internal sounds, and a GNSS receiver 56 that detects a location of the automobile 10. The GNSS receiver 56 receives radio waves from a plurality of GNSS satellites to acquire a current time and a latitude and a longitude serving as a current location of the automobile 10. The detection ECU 26 acquires detection information from each detection member, and outputs data including the detection information to the vehicle network 36. The detection ECU 26 may execute processes based on the detection information, and incorporate results of the processes as data. For example, when the three-axis acceleration sensor 52 detects an acceleration higher than a collision detection threshold, the detection ECU 26 may make determination about collision detection and incorporate a result of the collision detection as data. The detection ECU 26 may extract, from an image obtained by the stereo camera 53, objects around the automobile 10 such as moving objects including a pedestrian and a different automobile 10, a roadside tree, a utility pole, and a guardrail, make determination about types and attributes of the objects, estimate relative directions and relative distances of the objects or moving directions when the objects are moving based on positions, sizes, and changes of the objects in the image, and output data including prediction information related to collision with the other objects and including results of the estimation to the vehicle network 36.

A wide-area communication device 61 is coupled to the wide-area communication ECU 27. The wide-area communication device 61 establishes wireless communication with a base station 6 of the wireless communication network 5 near the automobile 10. The wide-area communication ECU 27 exchanges data with the server 2 via the wireless communication network 5 through the wireless communication between the wide-area communication device 61 and the base station 6. Those devices constitute a wide-area communicator 60 of the automobile 10. In one example, the wide-area communicator 60 may serve as a communicator of the automobile 10.

A V2X communication device 71 is coupled to the V2X communication ECU 28. The V2X communication device 71 and the V2X communication ECU 28 constitute a V2X communicator 70. The V2X communication device 71 exchanges data with the V2X communicator 70 of a nearby automobile 10. The wide-area communicator 60 may double as the V2X communicator 70.

The traveling control ECU 24 controls traveling of the automobile 10. For example, the traveling control ECU 24 acquires data from the wide-area communication ECU 27, the detection ECU 26, and the driving operation ECU 25 via the vehicle network 36, and executes autonomous or manual driving assistance control for the automobile 10. The traveling control ECU 24 generates traveling control data for the automobile 10 based on the acquired data, and outputs the traveling control data to the drive ECU 21, the steering ECU 22, and the braking ECU 23. The drive ECU 21, the steering ECU 22, and the braking ECU 23 control the traveling of the automobile 10 based on the input traveling control data.

A plurality of seatbelt devices, a plurality of air bag devices, and an occupant protection memory 87 are coupled to the occupant protection ECU 30. Examples of the seatbelt devices include a driver's seatbelt device 81 for a driver of the automobile 10, and a passenger's seatbelt device 82 for a passenger of the automobile 10. Examples of the air bag devices include a driver's front air bag device 83 that inflates in front of the driver, a driver's curtain air bag device 84 that inflates on an outer side of the driver, a passenger's front air bag device 85 that inflates in front of the passenger, and a passenger's curtain air bag device 86 that inflates on an outer side of the passenger. Those devices constitute an occupant protection device 80.

The occupant protection ECU 30 actuates or controls the seatbelt devices and the air bag devices based on either one of prediction information on collision with other objects and information on a result of collision detection from the detection ECU 26.

The occupant protection memory 87 is a computer-readable recording medium and records, for example, setting values and programs to be executed by the occupant protection ECU 30. The occupant protection memory 87 may record information on details of control of the occupant protection ECU 30. The occupant protection ECU 30 reads and executes the programs in the occupant protection memory 87. Thus, the occupant protection ECU 30 may serve as an occupant protection controller of the automobile 10. When an emergency such as collision is detected or estimated, the occupant protection ECU 30 executes an occupant protection process, collects emergency information related to the emergency, and transmits the emergency information to the outside via the V2X communicator 70. For example, the transmitted emergency information may be received by a succeeding automobile as illustrated in FIG. 1. The occupant protection ECU 30 may transmit the emergency information via the wide-area communicator 60. In this case, the transmitted emergency information may be received by, for example, a succeeding automobile as illustrated in FIG. 1 via a base station 6 or via the server 2 and another base station 6 as appropriate.

Figure 3:
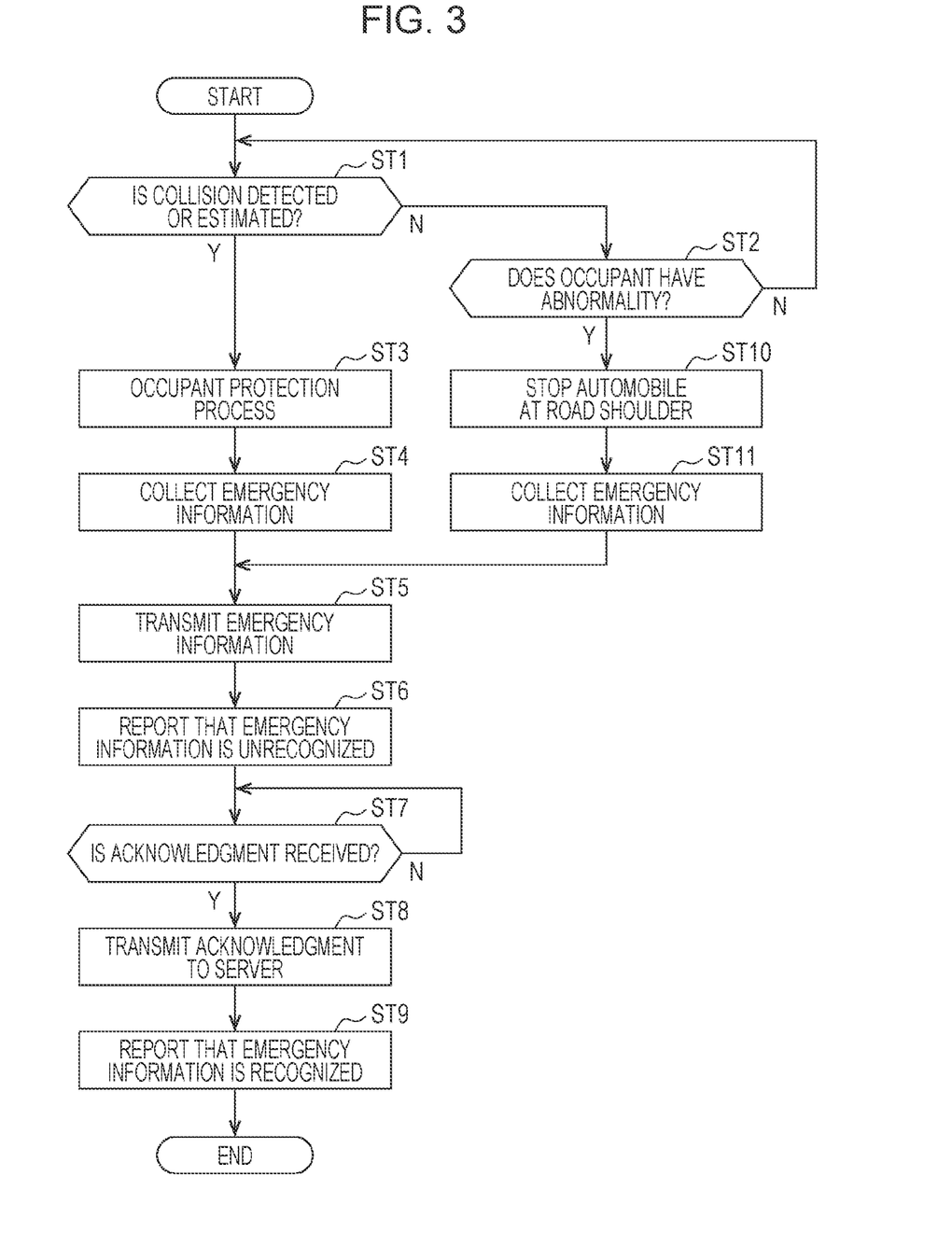
FIG. 3 is a flowchart of an emergency process including a process for transmitting emergency information in the automobile of FIG. 2.

FIG. 3 is a flowchart of an emergency process including a process for transmitting emergency information in the automobile 10 of FIG. 2.

The automobile 10 repeats the process of FIG. 3.

In Step ST1, the detection ECU 26 detects or estimates collision of the automobile 10. For example, the detection ECU 26 may detect the collision when a detection value from the three-axis acceleration sensor 52 is equal to or larger than an abnormality threshold. For example, the detection ECU 26 may predict that the collision is inevitable by determining whether any moving object is approaching the automobile 10 based on an image obtained by the stereo camera 53. When no collision is detected or predicted, the detection ECU 26 advances the process to Step ST2. When the collision is detected or predicted, the detection ECU 26 transmits collision detection information to the occupant protection ECU 30, and advances the process to Step ST3.

The occupant protection ECU 30 may execute a preparatory process for protecting the occupant before the collision detection based on prediction of inevitable collision. As an example of the preparatory process, the occupant protection ECU 30 may take up a surplus part of a seatbelt of the seatbelt device to achieve a pre-tensioned state, or may execute other processes. For example, the occupant protection ECU 30 may pre-inflate the air bag device.

In Step ST2, the occupant protection ECU 30 determines whether the occupant of the automobile 10 has any abnormality. For example, the occupant protection ECU 30 determines an occupant's health level based on an image from the cabin camera 54. During driving, the occupant may become unconscious or sleep. When the occupant has no abnormality, the occupant protection ECU 30 returns the process to Step ST1. In this case, the occupant protection ECU 30 and the detection ECU 26 repeat the processes of Step ST1 and Step ST2. In one example, the occupant protection ECU 30 and the detection ECU 26 may serve as an emergency detector to detect or estimate an emergency such as collision that causes the automobile 10 to stop. When the occupant has an abnormality, the occupant protection ECU 30 advances the process to Step ST10.

In Step ST3, the occupant protection ECU 30 executes the occupant protection process based on the information on either one of collision detection and collision prediction from the detection ECU 26. The occupant protection ECU 30 selects and actuates any seatbelt device and any air bag device. The occupant protection ECU 30 takes up a surplus part of the seatbelt of the selected seatbelt device to achieve a pre-tensioned state. Based on an input direction and an intensity of the predicted collision, the occupant protection ECU 30 selects and actuates an air bag device that will inflate on the side where the upper body of the occupant may fall down due to the collision. Thus, the seated occupant can be held on the seat and a shock can be absorbed by the air bag even if the occupant is thrown off the seat.

In Step ST4, the occupant protection ECU 30 collects emergency information related to the collision of the automobile 10. The emergency information indicates at least a state of the automobile 10 caused by the collision and a state of the occupant of the automobile 10 caused by the collision.

For example, the occupant protection ECU 30 collects information on an input direction and an intensity of the shock, a currently stopping location and time at the accident, and the seatbelt device and the air bag device actuated in the occupant protection process.

For example, the occupant protection ECU 30 may collect, as information on the state of the occupant in the automobile 10, information on a position of the seated occupant, a status of the seatbelt, an injury of the occupant in the collision, and an image of the cabin.

As the state of the occupant of the automobile 10 caused by the collision, the occupant protection ECU 30 may collect information as to whether the occupant attempts to or may escape from the automobile 10. Examples of information related to the escape include information on motion of the occupant in the cabin image, information on either one of detection and estimation of consciousness, information on a seatbelt sensor, door lock or opening information, and detection information from the operation device 42 related to an occupant's operation on an escape button displayed on the display device 41. When the seatbelt sensor detects that the seatbelt is unfastened, the door lock or opening information indicates that the door is open, or the operation device 42 detects the occupant's operation on the escape button, the occupant protection ECU 30 may generate information indicating that the occupant attempts to escape from the automobile 10 as the information on the state of the occupant of the automobile 10 caused by the collision.

The emergency information related to the collision of the automobile 10 may be collected by either one of the V2X communication ECU 28 of the V2X communicator 70 and the wide-area communication ECU 27 of the wide-area communicator 60.

In Step ST5, the V2X communication ECU 28 of the V2X communicator 70 transmits the emergency information collected by the occupant protection ECU 30 to, for example, a succeeding automobile by using the V2X communication device 71. The wide-area communication ECU 27 of the wide-area communicator 60 may transmit the collected emergency information to, for example, the succeeding automobile via the server 2 by using the wide-area communication device 61. In one example, the V2X communication ECU 28 and the wide-area communication ECU 27 may serve as the communicator to, when the emergency such as an accident of the automobile 10 is detected or estimated, transmit the information related to the emergency to the outside so that the succeeding automobile receives the information related to the emergency. The automobile 10 transmits collision information to the succeeding automobile directly through vehicle-to-vehicle communication or indirectly via the server 2 coupled to the wireless communication network 5.

In Step ST6, either one of the V2X communication ECU 28 and the wide-area communication ECU 27 after the external communication notifies the UI operation ECU 29 that the emergency information is transmitted to the succeeding automobile. After the emergency information is transmitted to the succeeding automobile, the UI operation ECU 29 reports to the occupant that the emergency information is unrecognized by an occupant of the succeeding automobile. For example, the UI operation ECU 29 causes either one of the display device 41 and a loudspeaker (not illustrated) to report that the emergency information of the automobile 10 is unrecognized by the occupant of the succeeding automobile.

In Step ST7, either one of the V2X communication ECU 28 and the wide-area communication ECU 27 determines whether either one of the V2X communicator 70 and the wide-area communicator 60 used for transmitting the information related to the emergency receives acknowledgment information from the succeeding automobile about reception of the information related to the emergency. When the acknowledgment information is not received from the succeeding automobile, either one of the V2X communication ECU 28 and the wide-area communication ECU 27 repeats this process. When the acknowledgment information is received from the succeeding automobile, either one of the V2X communication ECU 28 and the wide-area communication ECU 27 advances the process to Step ST8. Thus, the occupant protection ECU 30 receives acknowledgment information about the collision information from the succeeding automobile directly through the vehicle-to-vehicle communication or indirectly via the server coupled to the wireless communication network 5.

In Step ST8, the wide-area communication ECU 27 transmits the received acknowledgment information to the server 2 via the wireless communication network 5 including the base stations 6. The wide-area communication ECU 27 may transmit accident information to the server 2 together with or prior to the acknowledgment information.

In Step ST9, either one of the V2X communication ECU 28 and the wide-area communication ECU 27 notifies the UI operation ECU 29 that the acknowledgment information is received from the succeeding automobile. The UI operation ECU 29 reports to the occupant that the emergency information is recognized by the occupant of the succeeding automobile. The UI operation ECU 29 switches the output of either one of the display device 41 and the loudspeaker (not illustrated) reporting from the timing of Step ST6 that the emergency information is unrecognized to an output reporting that the emergency information is recognized. In one example, the UI operation ECU 29 may serve as a reporter to, after the communicator transmits the information related to the emergency, report to the occupant by either one of sound and display whether the communicator receives the acknowledgment information from the succeeding automobile.

Step ST10 is executed when determination is made in Step ST2 that the occupant has an abnormality. The occupant protection ECU 30 executes the emergency process for stopping the automobile 10 at a shoulder of a currently traveling road. The occupant protection ECU 30 causes the traveling control ECU 24 to execute the emergency process.

In Step ST11, the occupant protection ECU 30 collects emergency information related to the occupant. Examples of the emergency information related to the occupant include information on occupant's body conditions such as a pupil and pulse, and an image of the occupant. Then, the occupant protection ECU 30 advances the process to Step ST5.

Figure 4:
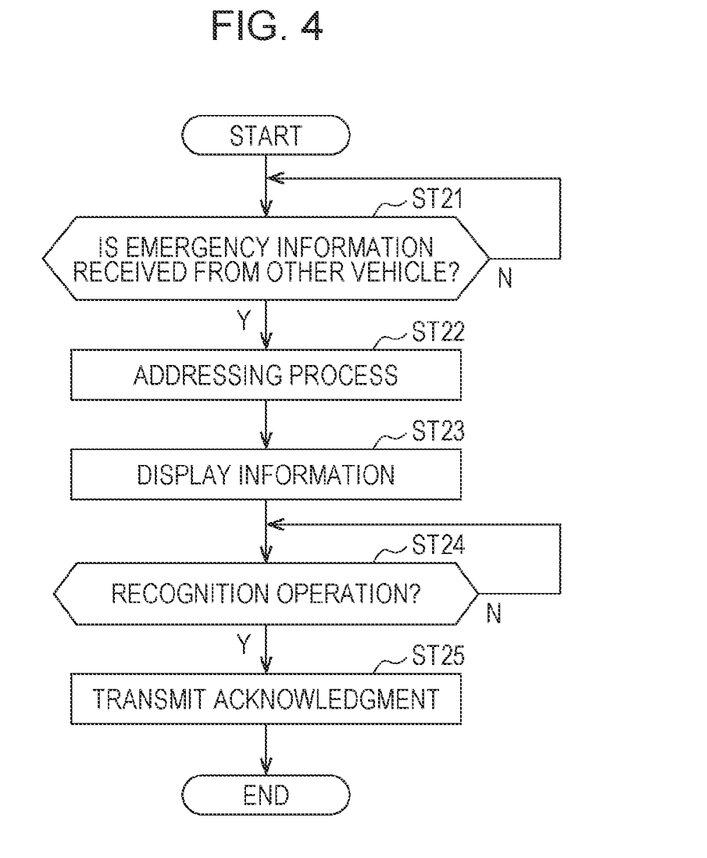
FIG. 4 is a flowchart of an emergency response process including a process for receiving emergency information in the automobile of FIG. 2.

FIG. 4 is a flowchart of an emergency response process including a process for receiving emergency information in the automobile 10 of FIG. 2.

The automobile 10 repeats the process of FIG. 4 to receive emergency information from any other automobile 10.

In Step ST21, either one of the V2X communication ECU 28 and the wide-area communication ECU 27 determines whether either one of the V2X communicator 70 and the wide-area communicator 60 receives emergency information from any other automobile. When emergency information of any other automobile is not received, either one of the V2X communication ECU 28 and the wide-area communication ECU 27 repeats this process. When emergency information of any other automobile is received, either one of the V2X communication ECU 28 and the wide-area communication ECU 27 advances the process to Step ST22.

In Step ST22, either one of the V2X communication ECU 28 and the wide-area communication ECU 27 reports via an internal network that the emergency information of the other automobile is received. Based on the report, the occupant protection ECU 30 and the traveling control ECU 24 execute an addressing process responding to the received emergency information. The traveling control ECU 24 causes its automobile 10 to decelerate, stop, or detour. When inevitable collision is predicted, the occupant protection ECU 30 executes the occupant protection process.

In Step ST23, the UI operation ECU 29 displays the received emergency information. For example, the UI operation ECU 29 displays the received emergency information on the display device 41.

In Step ST24, the UI operation ECU 29 determines whether a recognition operation is performed on the received emergency information. The occupant views the received emergency information on the display device 41 and performs a recognition operation on the operation device 42. When the recognition operation is not performed, the UI operation ECU 29 repeats this process to wait for the recognition operation. When the recognition operation is performed, the UI operation ECU 29 notifies either one of the V2X communication ECU 28 and the wide-area communication ECU 27 that the recognition operation is performed, and advances the process to Step ST25.

In Step ST25, either one of the V2X communication ECU 28 and the wide-area communication ECU 27 transmits acknowledgment information indicating that the emergency information is received. Thus, when the information related to the emergency of the other automobile is received, either one of the V2X communication ECU 28 and the wide-area communication ECU 27 can transmit the acknowledgment information toward the other automobile after the occupant performs the recognition operation.

Figure 5:
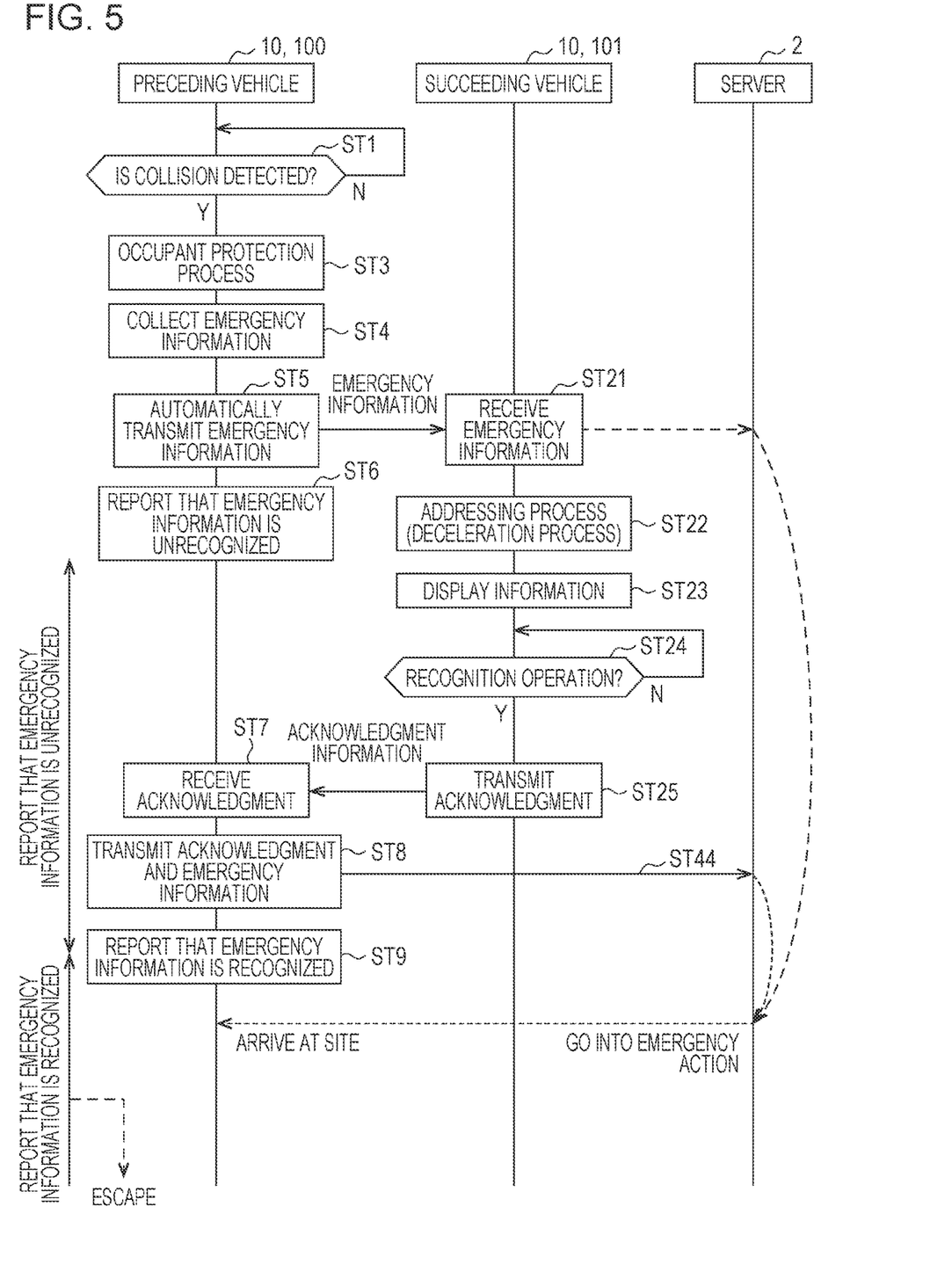
FIG. 5 is a sequence chart illustrating a flow of an emergency reporting process to be executed when an accident such as collision has occurred in the emergency reporting system of FIG. 1.

FIG. 5 is a sequence chart illustrating a flow of an emergency reporting process to be executed when an accident such as collision has occurred in the emergency reporting system 1 of FIG. 1.

FIG. 5 illustrates a preceding automobile 100 that is an automobile 10 in the accident, an automobile 101 succeeding the preceding automobile 100, and the server 2. In FIG. 5, the process advances from top to bottom.

In Step ST1, the detection ECU 26 of the preceding automobile 100 detects the collision of the preceding automobile 100.

In Step ST3, the occupant protection ECU 30 of the preceding automobile 100 executes the occupant protection process to protect an occupant from the collision.

In Step ST4, the occupant protection ECU 30 of the preceding automobile 100 collects emergency information related to the collision.

In Step ST5, either one of the V2X communication ECU 28 and the wide-area communication ECU 27 of the preceding automobile 100 automatically transmits the collected emergency information to the succeeding automobile 101. The wide-area communication ECU 27 of the preceding automobile 100 may automatically transmit the collected emergency information also to the server 2 at this timing.

In Step ST6, the UI operation ECU 29 of the preceding automobile 100 uses the display device 41 to report that the emergency information is unrecognized by an occupant of the succeeding automobile 101.

In Step ST21, either one of the V2X communication ECU 28 and the wide-area communication ECU 27 of the succeeding automobile 101 receives the emergency information from the preceding automobile 100 in the accident.

In Step ST22, the occupant protection ECU 30 and the traveling control ECU 24 of the succeeding automobile 101 execute the addressing process for the accident of the preceding automobile 100 based on the received emergency information.

In Step ST23, the UI operation ECU 29 of the succeeding automobile 101 displays the received emergency information on the display device 41.

In Step ST24, the UI operation ECU 29 of the succeeding automobile 101 determines whether the occupant of the succeeding automobile 101 performs an information recognition operation.

In Step ST25, either one of the V2X communication ECU 28 and the wide-area communication ECU 27 of the succeeding automobile 101 transmits, to the preceding automobile 100 in the accident, acknowledgment information responding to the emergency information from the preceding automobile 100.

In Step ST7, either one of the V2X communication ECU 28 and the wide-area communication ECU 27 of the preceding automobile 100 receives the acknowledgment information from the succeeding automobile 101.

In Step ST8, the wide-area communication ECU 27 of the preceding automobile 100 transmits, to the server 2, the emergency information and the acknowledgment information from the succeeding automobile 101.

In Step ST9, the UI operation ECU 29 of the preceding automobile 100 uses the display device 41 to report that the emergency information is recognized by the occupant of the succeeding automobile 101.

In Step ST44, the server 2 receives the emergency information and the acknowledgment information from the preceding automobile 100 in the accident. For example, a fire department that manages the server 2 can determine whether multiple collisions have occurred involving the succeeding automobile 101, and send an appropriate number of staff members to the site of the accident. The staff members sent to the site can provide first aid depending on the seriousness of the accident.

In this embodiment, when an emergency such as collision that causes the automobile 10 to stop is detected or estimated, the communicator transmits information related to emergency to the outside so that the succeeding automobile 101 receives the information related to the emergency. The communicator may exchange the emergency information and acknowledgment information with the succeeding automobile 101 directly through vehicle-to-vehicle communication or indirectly via the server coupled to the wireless communication network 5. Thus, the occupant such as a driver of the succeeding automobile 101 can grasp and address the collision occurring in the preceding automobile 100. By transmitting, for example, information on either one of a state of the automobile 10 caused by the collision and a state of the occupant of the automobile 10 caused by the collision as the emergency information related to the collision, the occupant of the succeeding automobile 101 can address the collision occurring in the preceding automobile 100 by grasping the degree and details of the collision before arriving at the site of the collision.

After the information related to the emergency is transmitted, the communicator of the automobile 10 whose emergency is detected or estimated receives the acknowledgment information from the succeeding automobile 101 about reception of the emergency information. Thus, the occupant of the automobile 10 whose emergency is detected or estimated can determine a change in the situation after the collision depending on whether the communicator receives the acknowledgment information from the succeeding automobile 101. For example, when the communicator receives the acknowledgment information from the succeeding automobile 101, there is a low possibility that the succeeding automobile 101 causes secondary collision with the automobile 10 whose emergency is detected or estimated. There is also a low possibility that the succeeding automobile 101 collides with the occupant escaping to a road from the automobile 10 whose emergency is detected or estimated. When the communicator does not receive the acknowledgment information from the succeeding automobile 101, either one of the automobile 10 whose emergency is detected or estimated and the occupant escaping from the automobile 10 may collide with the succeeding automobile 101 outside the sight of the occupant. Whether the communicator receives the acknowledgment information from the succeeding automobile 101 is useful for the occupant to take action by determining the change in the situation after the emergency more appropriately. The occupant of the automobile 10 whose emergency is detected or estimated can appropriately determine whether to escape or wait at present and determine a timing after determining to escape. For example, the reporter is provided to report to the occupant by either one of sound and display whether the communicator receives the acknowledgment information from the succeeding automobile 101, and continues to report the reception status after the communicator transmits the information related to the emergency. Thus, the occupant of the automobile 10 whose emergency is detected or estimated can grasp a timing when the occupant of the succeeding automobile 101 recognizes the emergency of the automobile 10, and escape from the automobile 10 with higher safety after the timing. It can be expected that the secondary collision of the succeeding automobile 101 is reduced.

The embodiment described above is an exemplary embodiment of the disclosure, but the embodiment of the disclosure is not limited to this embodiment, and various modifications and changes may be made without departing from the gist of the disclosure.

In the embodiment described above, the plurality of ECUs are provided separately in the automobile 10, but a subset or all of the ECUs may be integrated into a single ECU.

In the embodiment described above, the process for reporting the emergency information in FIG. 3 and FIG. 4 is executed by the occupant protection ECU 30.

The process may be executed by another control ECU in the control system 20, such as the traveling control ECU 24 and the detection ECU 26.

In the embodiment of the disclosure, when an emergency such as collision that causes the vehicle to stop is detected or estimated, the communicator transmits information related to the emergency information to the outside so that the succeeding vehicle receives the emergency information. Thus, the occupant such as a driver of the succeeding vehicle can grasp and address the collision occurring in the preceding vehicle. By transmitting, for example, information on either one of a state of the vehicle caused by the collision and a state of the occupant of the vehicle caused by the collision as the emergency information related to the collision, the occupant of the succeeding vehicle can address the collision occurring in the preceding vehicle by grasping the degree and details of the collision before arriving at the site of the collision.

After the information related to the emergency is transmitted, the communicator of the vehicle whose emergency is detected or estimated receives acknowledgment information from the succeeding vehicle about reception of the emergency information. Thus, the occupant of the vehicle whose emergency is detected or estimated can determine a change in the situation after the collision depending on whether the communicator receives the acknowledgment information from the succeeding vehicle. For example, when the communicator receives the acknowledgment information from the succeeding vehicle, there is a low possibility that the succeeding vehicle causes secondary collision with the vehicle whose emergency is detected or estimated. There is also a low possibility that the succeeding vehicle collides with the occupant escaping to a road from the vehicle whose emergency is detected or estimated. When the communicator does not receive the acknowledgment information from the succeeding vehicle, either one of the vehicle whose emergency is detected or estimated and the occupant escaping from the vehicle may collide with the succeeding vehicle outside the sight of the occupant. Whether the communicator receives the acknowledgment information from the succeeding vehicle is useful for the occupant to take action by determining the change in the situation after the emergency more appropriately. The occupant of the vehicle whose emergency is detected or estimated can appropriately determine whether to escape or wait at present and determine a timing after determining to escape. For example, the reporter is provided to report to the occupant whether the communicator receives the acknowledgment information from the succeeding vehicle, and continues to report the reception status after the communicator transmits the information related to the emergency. Thus, the occupant of the vehicle whose emergency is detected or estimated can grasp a timing when the occupant of the succeeding vehicle recognizes the emergency of the vehicle, and escape from the vehicle with higher safety after the timing. It can be expected that the secondary collision of the succeeding vehicle or other vehicles is reduced.

The control system 20 illustrated in FIG. 2 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the control system 20 including the drive ECU 21, the steering ECU 22, the braking ECU 23, the traveling control ECU 24, the driving operation ECU 25, the detection ECU 26, the wide-area communication ECU 27, the V2X communication ECU 28, the UI operation ECU 29, and the occupant protection ECU 30. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the non-volatile memory may include a ROM and a NVRAM. The ASIC is an integrated circuit (IC) customized to perform, and the FPGA is an integrated circuit designed to be configured after manufacturing in order to perform, all or a part of the functions of the modules illustrated in FIG. 2.

The invention claimed is:

1. An emergency reporting device for a vehicle, the emergency reporting device comprising one or more electronic control units (ECUs) configured to:

detect or estimate an emergency including a collision of the vehicle;

cause, when the emergency of the vehicle is detected or estimated, a communicator of the vehicle to transmit information related to the emergency to outside the vehicle so that a succeeding vehicle receives the information related to the emergency; and cause a notification device of the vehicle to output a first notification based on receiving, after the information related to the emergency is transmitted to outside the vehicle, from outside the vehicle, acknowledgment information generated based on a recognition operation on an operation device of the succeeding vehicle by an occupant of the succeeding vehicle with respect to the received information related to the emergency, wherein the one or more ECUs is configured to:

cause, in response to causing the communicator to transmit the information related to emergency to outside the vehicle, the notification device to output a second notification indicating that the information related to the emergency is unrecognized by the occupant of the succeeding vehicle; and cause, in response to receiving the acknowledgment information, the notification device to output the first notification indicating that the acknowledgment information is received from the succeeding vehicle from the notification device to change the second notification into the first notification.

2. The emergency reporting device for the vehicle according to claim 1, wherein the one or more ECUs is configured to cause the communicator to transmit, as the information related to the emergency, at least one of a state of the vehicle caused by the collision or a state of an occupant in the vehicle caused by the collision.

3. The emergency reporting device for the vehicle according to claim 2, wherein the one or more ECUs is configured to cause the communicator to transmit, when the acknowledgment information is received from the succeeding vehicle, the received acknowledgment information to a server via a wireless communication network.

4. The emergency reporting device for the vehicle according to claim 3, wherein the one or more ECUs is configured to cause the communicator to transmit, when information related to an emergency of another vehicle is received, acknowledgment information toward the another vehicle after the occupant in the vehicle recognizes the information related to the emergency of the another vehicle.

5. The emergency reporting device for the vehicle according to claim 2, wherein the one or more ECUs is configured to cause the communicator to transmit, when information related to an emergency of another vehicle is received, acknowledgment information toward the another vehicle after the occupant in the vehicle recognizes the information related to the emergency of the another vehicle.

6. The emergency reporting device for the vehicle according to claim 1, wherein the one or more ECUs is configured to cause the communicator to transmit, when the acknowledgment information is received from the succeeding vehicle, the received acknowledgment information to a server via a wireless communication network.

7. The emergency reporting device for the vehicle according to claim 6, wherein the one or more ECUs is configured to cause the communicator to transmit, when information related to an emergency of another vehicle is received, acknowledgment information toward the another vehicle after an occupant in the vehicle recognizes the information related to the emergency of the another vehicle.

8. The emergency reporting device for the vehicle according to claim 1, wherein the one or more ECUs is configured to cause the communicator to transmit, when information related to an emergency of another vehicle is received, acknowledgment information toward the another vehicle after an occupant in the vehicle recognizes the information related to the emergency of the another vehicle.

9. An emergency reporting device for a vehicle, the emergency reporting device comprising circuitry configured to cause one or more processors of the vehicle to execute processing including:

detecting or estimating an emergency including a collision of the vehicle;

causing, when the emergency of the vehicle is detected or estimated, a communicator of the vehicle to transmit information related to the emergency to outside the vehicle so that a succeeding vehicle receives the information related to the emergency;

causing a notification device of the vehicle to output a first notification based on receiving, after the information related to the emergency is transmitted to outside the vehicle, from outside the vehicle, acknowledgment information generated based on a recognition operation on an operation device of the succeeding vehicle by an occupant of the succeeding vehicle with respect to the received information related to the emergency, wherein the processing includes:

causing, in response to causing the communicator to transmit the information related to emergency to outside the vehicle, the notification device to output a second notification indicating that the information related to the emergency is unrecognized by the occupant of the succeeding vehicle; and causing, in response to receiving the acknowledgment information, the notification device to output the first notification indicating that the acknowledgment information is received from the succeeding vehicle from the notification device to change the second notification into the first notification.

* * * * *